United States Patent
Bogart et al.

(10) Patent No.: US 11,564,303 B2
(45) Date of Patent: Jan. 24, 2023

(54) MULTIPLE SPECTRUM (VISIBLE AND NON VISIBLE) LIGHTING WITH ADJUSTABLE CONTROL SYSTEM

(71) Applicants: Mitchell J. Bogart, New Haven, CT (US); Asher Baum, Brooklyn, NY (US); Eliyahu Bogart, New Haven, CT (US)

(72) Inventors: Mitchell J. Bogart, New Haven, CT (US); Asher Baum, Brooklyn, NY (US); Eliyahu Bogart, New Haven, CT (US)

( * ) Notice: Subject to any disclaimer, the term of this patent is extended or adjusted under 35 U.S.C. 154(b) by 0 days.

(21) Appl. No.: 17/181,312

(22) Filed: Feb. 22, 2021

(65) Prior Publication Data

US 2021/0352792 A1  Nov. 11, 2021

Related U.S. Application Data

(63) Continuation-in-part of application No. 17/068,747, filed on Oct. 12, 2020, now abandoned, which is a continuation-in-part of application No. 16/600,508, filed on Oct. 13, 2019, now Pat. No. 10,802,524, which is a continuation-in-part of application No. 15/866,244, filed on Jan. 9, 2018, now Pat. No. 10,448,447.

(60) Provisional application No. 62/941,773, filed on Nov. 28, 2019.

(51) Int. Cl.
H05B 47/155 (2020.01)
H05B 47/19 (2020.01)
H05B 47/115 (2020.01)

(52) U.S. Cl.
CPC ......... *H05B 47/155* (2020.01); *H05B 47/115* (2020.01); *H05B 47/19* (2020.01)

(58) Field of Classification Search
CPC .... H05B 47/155; H05B 47/115; H05B 47/19; H05B 45/20; Y02B 20/30; Y02B 20/40; F21K 9/232; A61L 2/10; A61L 2202/14; A61L 2202/25; A61L 2209/12
See application file for complete search history.

(56) References Cited

U.S. PATENT DOCUMENTS

| | | | | |
|---|---|---|---|---|
| 6,464,760 B1 * | 10/2002 | Sham | ................ | B01D 46/0015 55/318 |
| 7,038,399 B2 * | 5/2006 | Lys | ................... | H05B 45/3725 315/291 |
| 8,491,159 B2 * | 7/2013 | Recker | .................. | H05B 45/37 362/276 |
| 8,905,610 B2 * | 12/2014 | Coleman | ............. | G02B 6/0036 362/554 |
| 9,204,518 B2 * | 12/2015 | Jung | .................. | F21V 23/0464 |
| 9,393,338 B2 * | 7/2016 | Livchak | .................. | F24F 3/16 |
| 9,700,641 B2 * | 7/2017 | Hawkins | ............... | H05B 47/10 |
| 10,448,477 B2 * | 10/2019 | Bogart | .................... | G05F 1/625 |

(Continued)

*Primary Examiner* — Haissa Philogene
(74) *Attorney, Agent, or Firm* — Israel Nissenbaum; Yitzy Nissenbaum

(57) ABSTRACT

A light bulb or fixture design is presented with dual types of light spectra (visible and invisible UV), having economic benefits stemming from the use of a single bulb, single bulb socket, and single fixture capable of providing selection of different spectra type illumination states and other types of adjustability with a minimum of additional bulbs, additional wiring, additional fixtures and additional instruction in use.

17 Claims, 6 Drawing Sheets

(56) References Cited

U.S. PATENT DOCUMENTS

| | | | | |
|---|---|---|---|---|
| 10,802,524 | B2* | 10/2020 | Bogart | H02J 3/14 |
| 11,147,984 | B2* | 10/2021 | Emerson | A61N 5/0624 |
| 2012/0138822 | A1* | 6/2012 | Leben | B66B 11/024 |
| | | | | 250/492.1 |
| 2012/0281398 | A1* | 11/2012 | King | F21S 4/10 |
| | | | | 362/231 |
| 2017/0321877 | A1* | 11/2017 | Polidoro | A61L 9/20 |
| 2019/0255201 | A1* | 8/2019 | Rosen | A61L 2/0052 |

* cited by examiner

Bottom view (facing down)

Top view (facing up)

MULTIPLE SPECTRUM (VISIBLE AND NON VISIBLE) LIGHTING WITH ADJUSTABLE CONTROL SYSTEM

This application is a continuation-in-part of U.S. Ser. No. 17/068,747 filed Oct. 12, 2020 which takes priority from provisional patent application No. 62/941,773, filed Nov. 28, 2019 and which is also a CIP of U.S. Ser. No. 16/600,508 filed Oct. 13, 2019, now U.S. patent Ser. No. 10/802,524, which is a continuation-in-part of U.S. Ser. No. 15/866,244, filed Jan. 9, 2018, now U.S. Pat. No. 10,448,477, which takes priority from U.S. provisional patent application No. 62/909,116, filed Jan. 23, 2017, the disclosures of which are entirely included herein by reference thereto.

FIELD OF THE INVENTION

This invention relates to multifunction single light sources and controls therefor and for electrical devices with multiphase or function, light fixtures and modules and the like and particularly to multiple spectrum lighting and controls.

BACKGROUND OF THE INVENTION

The parents of this application, as enumerated above, relate to an upgraded form of light control for the configurations of one or more electrical devices such as ceiling fans and light bulbs, alone or in a fixture, lamp, wall or ceiling, with power controlled by one or more switches.

There are prior art multiple color emitting light bulbs, for example adjustable White color, or RGB (Red Green Blue) any color light bulbs. The light from those light bulbs is direct and visible and visually aesthetic or pleasing or provides a beneficial effect, whether people view it transmitted through various diffusers or after being reflected off objects in the room or vicinity. One such type of light spectrum is the Red+Purple light of Grow lights and fixtures. This light specifically benefits plants. In fact, various spectra are tailor made for different plant phases such as the growth and flowering phases. Green wavelengths, most appreciated by humans when looking at vegetation, are mostly ignored and reflected by plants, hence their green color.

Another such not-directly-for-humans light spectrum is the primarily invisible spectrum ultra-violet (UV). UV light is arbitrarily categorized by the center of its wavelength as UV-A, UV-B, and UV-C, for long, medium, and shortest wavelengths, respectively. All three have non-beneficial effects for humans according to the WHO (World Health Organization) and are of varying degrees of exposure safety. Low level "black light" in the visible portion of the UV spectrum (UV-A), is often used at parties, and thought to be the safest. When reflected off white clothes or fluorescent paints and dyes, these objects appear to light up, adding to a more exotic or interesting mood. UVB and UVC light have much stronger effect, but are strongly indirect and generally invisible. They do have a direct germicidal effect, destroying viruses, bacteria, and fungi, life forms, thereby being of benefit by providing safer, more sanitary environments. Exposure to such light is thought to be detrimental particularly over long durations.

Another type of light, infrared light, is also beneficial but in a less invisible and indirect way. It is minimally visible, yet penetrates skin and warms body tissue, expanding blood vessels, thus increasing circulation to parts of the body, providing them with more nutrients, oxygen, and $CO_2$ and waste removal. Because of their very low wavelength solid-state emitters of infrared are also ceramic rather than just LED at this time.

A distinction has thus been made between 1) light bulbs offering adjustable White (Cool-Warm-Natural) or RGB (any color you want) light, both of which are for the direct and visual effect (i.e., visible); and 2) light bulbs whose spectra of light states includes some light having the aforementioned, as well as other non-direct and/or non-visual effects (i.e., invisible, or of low visibility).

SUMMARY

The devices of the invention, bulbs and fixtures, comprise light emitting elements of multiple types of spectra, Direct, Visible, and Human Affecting (DVHA) and Indirect, Non-visible, Non-human Affecting (INNA). A bulb of the invention, generally LED-based, for example is one that contains both Warm (and/or Cool) LEDs and also Ultra-violet LEDs (for example germicidal UV-A, UVB and/or UV-C). There are many benefits to this, which include: 1) Cost saving—One may buy a single bulb that illuminates a kitchen sink area during the day, and germicidally sanitizes it at night, or when not in use. 2) More efficient use of existing fixtures—They may all be fitted with Multi-Beneficial bulbs; there being no need for designating separate UV bulb and White bulb sockets 3) More powerful light benefits—installing in all fixtures bulbs all Multi-Beneficial bulbs, one maintains full room brightness with White light while also providing full germicidal light power when the room is un-occupied; 4) More comfortable lighting directions—as will be described subsequently with a described "garage" bulb or lighting fixture; and 5) Cost savings on custom wiring—no custom wiring is needed. Users select which type of spectra is needed, desired, or used as they see fit. The bulbs and ceiling fixtures are, in desirable embodiments, ceiling fixtures and bulbs that fit in standard fixtures such as A19/T4 T8 T12 fixtures.

Accordingly, the present invention generally comprises:

A light-emitting device comprising a plurality of individual light emitting sub-elements emitting two types of light spectra, a first type being visible, and a second type being invisible UV light or less visible to invisible infrared light. The light emitting device is capable of being selectively controlled with an array of control types and in embodiments directly replace existing light emitting devices in existing fixtures.

The types of selective control may include:

1—Direct light switch control. Light states cycle among a small set via flicks of the light switch, typically while a light is on, a brief flick to off and back cycles to the next state. The set of states might include for example, Full White, Full UV, and Mostly white with some UV.

2—A handheld RF or infrared controller, which directly communicates with the bulb or bulbs, letting the user select a wide variety of spectra combinations including on/off functions.

3—A passive RFID tag device within proximity of the bulb(s) or fixture(s) which activates an alternate state only when in proximity.

4—A smart phone App. Which communicates with the bulbs using the IOT (Internet of Things), or Bluetooth, or other wireless means.

5—A wired, wall switch version of any of the above.

6—The synchronizing method of light switch control (for bulbs with memory) specified in parent U.S. patent Ser. No. 10/448,477.

7—An integral proximity detector in the bulb or fixture which directly controls the bulb or fixture of which it a part, for example, but not limited to, turning off a potentially harmful UV illumination state when human presence is detected.

8—An automated version of any of the above, adding scheduling of On/Off periods and/or of lighting states.

9—Wireless control of a bulb, bulbs and fixtures whether full UV or combined white and UV.

Thus, full control of a device or devices of the invention may include: control via one or more light switches (option 1, above); control via some other manual method; and control via an automatic method, with, for example, an electronically controlled switch unit activating any of the manual methods.

A new type of multiple spectra light bulb or fixture is presented herein which includes economic benefits stemming from the use of a single bulb, single bulb socket, and single fixture capable of providing selection of different illumination states with a minimum of additional bulbs, additional wiring, additional fixtures and additional instruction in use.

The above, and other objects, features and advantages of the invention will become more evident from the following discussion and drawings in which.

SHORT DESCRIPTION OF THE DRAWINGS

FIGS. 4A, 4B and 4C show vertical, angled and horizontal panel positions respectively of the garage style bulb of FIG. 4;

DETAILED DESCRIPTION OF THE INVENTION AND DRAWINGS

Figure 1:
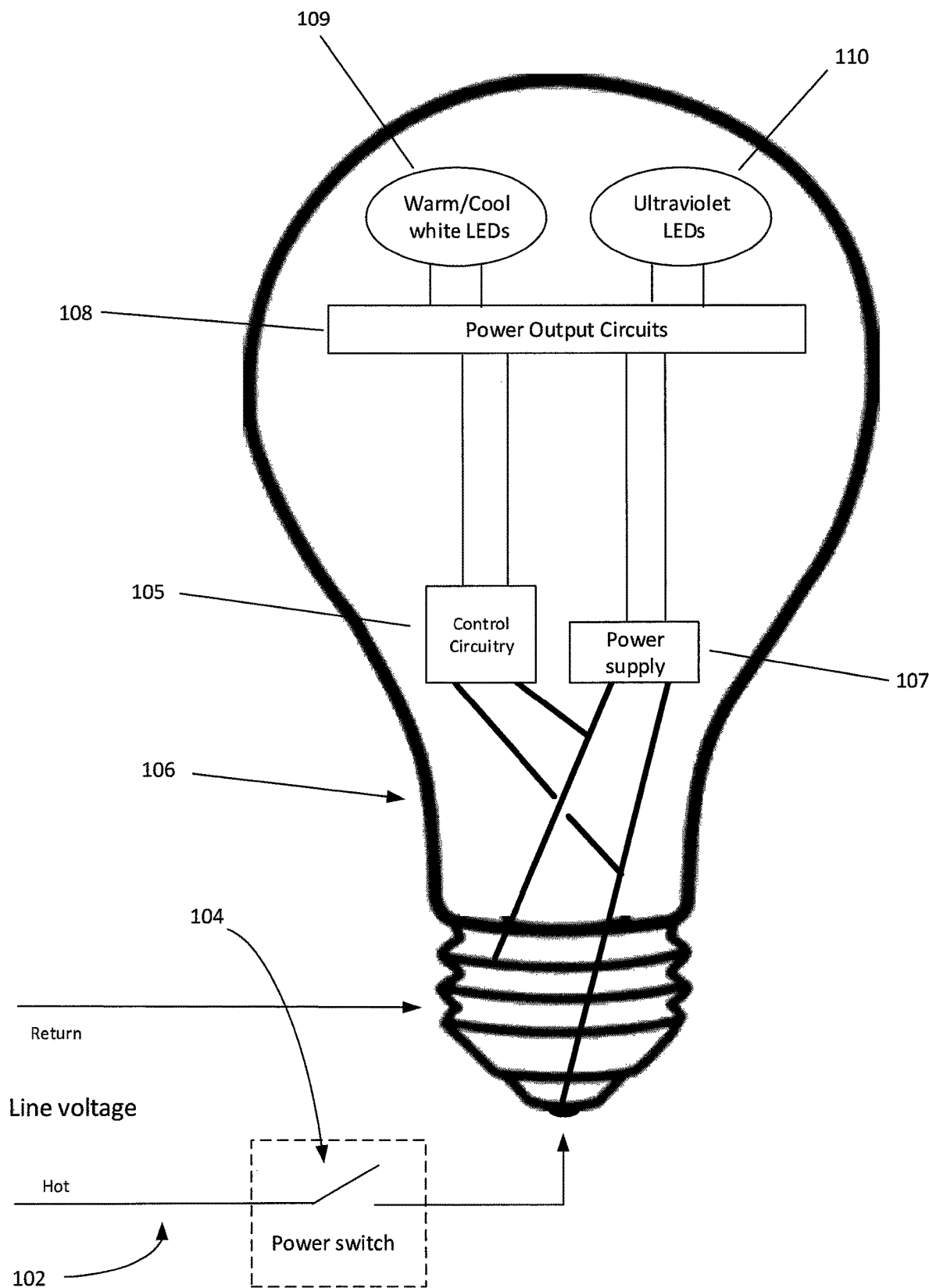
FIG. 1 shows a block diagram of a light bulb according to a first embodiment of the present invention with its internal components.

Many embodiments of the invention are possible including, but not limited to the specific examples of DVHA and INNA spectra combinations enumerated above. One might add combinations of multiple White DVHA states such as Warm, Cool, Natural, and even Candlelight, together with combinations of multiple INNA states such UV-A, UVB and UV-C.

A problem which the invention of the parent application addressed is a common consumer desire to change the emission of light in one way or another. However, the existing ways of accomplishing this each have limitations. For example, to change brightness, either a 3-way bulb or a light dimmer may be used. The 3-way bulb approach requires a special fixture with a 3-way light bulb socket. Adjustment of 3-way bulbs is only possible via the physical switch at the lamp socket, thus providing only a single local point of activation rather than by remote control. Electronic dimmers are widely available and provide a remote point of control. These dimmers however represent an additional purchase and require installation, which many consumers are not capable of or are not comfortable with, and which must be done properly, for reasons of both safety and proper operation.

Another desirable change is to alter the color temperature of the light. Currently this is generally done by replacing the light bulb with a different one, either Warm white or Cool white, according to the consumer's preference. Specialty adjustable color temperature bulbs are becoming more available and generally offer fully adjustable color and lower power output for the bulb size. They almost all use a hand-held RF (radio frequency) remote control or control via an App (application program) on a smart phone, though for some it is possible to install a special hard-wired control. These remote controls and Apps require a tech savvy consumer to setup and link the operation of multiple bulbs together, as each has its own radio channel or code. Additionally, Apps on smart phones require two hands, an inconvenience compared to a traditional switch when a hand is occupied in carrying something.

Still another type of desirable state change of a multi-state bulb relates to the general direction of light projection. For example, a screw in bulb type appears fixture-like as it includes multiple light emitting panels or "petals" that project in changeable directions, also referred to as a deformable bulb, fixture or device. It is sometimes referred to as a "Garage bulb", as garages frequently have simple, ceiling-mounted standard bulb sockets, which is a good match for a screw-in fixture bulb. The number of multiple states possible with the garage style bulb may be expanded, if one includes, in addition to the above mentioned:

1. Adjustable Brightness,
2. Adjustable Color Temperature,
3. An electrical motor or servo-motor mechanism to change the direction of angle of light emission. This may include one motor with a mechanical linkage to position additional petals or multiple motors to effect such positioning to the shown angles. One or more petals may alternatively be flipped, "hamburger style", that is, 180 degrees around its central radial axis, such that the petals' emission direction changes between upward and downward. The advantage of such flipping is that an upward direction, which is thus aimed at the ceiling produces very diffuse or soft light, which is extremely pleasant to the eyes, as well as more evenly illuminating contoured surfaces such as faces, such that shadows are reduced or eliminated, or
4. Rather than using mechanical devices such as motors, the LED petals may have LED emitters on both upper and lower of the petal's surfaces. The upward/downward selection is then done purely electrically via an electronic micro-controller within the garage light.

When many different adjustable aspects of a bulb or fixture are to be changed, the electronic power fluctuation or other control mechanism may be extended to provide multiple small cycles, rather than strictly sequencing through all possible state combinations in one large cycle. For example, an implementation may cycle through upward and downward directions with the first set of power fluctuations after initial power turn on, if desired, even if that is long after that power on event. After a suitable pause, subsequent second power fluctuations may cycle through Color Temperature changes, such as Warm-Cool-Both or Cool-Warm-UV, etc. After another suitable pause, if desired, a third set of power fluctuations may cycle through Brightness levels.

The parent applications disclose an additional limitation in that there are now at least two places to control the light, the existing light switch and the new remote, which the user must furthermore take care not to misplace. Use of hardwired light dimmers presents an additional limitation when it is desired to control very large numbers of light bulbs in unison. A large living room, recreation room, conference room, or auditorium may require many bulbs, perhaps as many as 10 to 100 or more for some institutions. A light dimmer has limited capacity, typically 300 watts and usually 500 watts at most. Even for very efficient light bulbs this capacity would easily be exceeded. Furthermore, such dimmers provide dimming control at one switch location only. Other switch locations, connected by using 3-way or 4-way wiring for those same lights, will not provide any dimming control. New types of digital Wifi solutions are also available, such as Insteon or GE Wink hubs. These do provide multiple location control and dimming—if one uses a smart phone or other additional devices. However, those systems are also definitely not for the high tech averse, of whom there are many. They are even not the choice of many gadget-loving people who simply desire regular, old-fashioned, reliable light switch control. It was the purpose of the parent application invention to provide a solution in the form of a replacement light bulb or fixture having incorporated therein all the features of dimming, color temperature change, and which are useful with very large number bulb installations, with virtually none of the above limitations.

The above problems and solution may relate with increased importance to devices such as special purpose multiple-state replacement light bulbs. This would include, for example, a combination White plus Ultraviolet light bulb and its need for quick, convenient, and synchronizable switch control so that the switching to and from UV emitting states is quick and easy, as the World Health Organization has declared that all UV is potentially harmful. Aggregate setting or resetting of all ultraviolet light bulbs from a UV state to a White or non-UV-emitting state may therefore be a safety consideration.

A logical and similar extension of convenient aggregate control of multiple devices in a single room would be to enhance switch-based power-fluctuation control to cover multiple logically related multiple switch circuits via a wireless control switch. For example, the rooms of an institution such as a cafeteria, gymnasium, school, restaurant, auditorium, theater, hospital, or a water environment such as a pool or water processing plant, an agricultural growing space, refrigeration units, or even a residential room, and other spaces prone to pathogenic collection or growth, or having one, or several light switches arranged adjacently as a logical bank. Each electrical device would have a wireless receiver and all such receivers and wireless remotes—transmitters—in a room would use a common communication channel. Switch control enables all the devices in the room to be identified simply by turning them On, or in some particular state, via the bank switches, within a short period of time relative to a signal from a remote. Afterwards, the devices in the room, for example the above combination White plus UV bulb, can be all turned off in unison, or otherwise further controlled at once, via either a remote or, as before, via power fluctuations of a bank switch on the circuit of which the device is part.

A method of synchronizing wireless control for devices in one room includes one set of multiple RF channels with two accepting a unique code from a specific controller within a set period of time that the lights are turned on.

These problems and solutions, encountered with multiple light bulbs, also extend to other electrical devices having similar control issues, but which are not light bulbs. These devices include ceiling fans with High-Medium-Low, fan speed controls which may be coupled to controls of lighting Light-Fan fixtures. Modules with multiple light bulbs and multiple modules are also similarly beset with control problems, as outlined above with respect to the single bulbs of the parent application. Furthermore, light switches have not been made with enhanced controls other than ON/OFF and dimming controls with specific bulbs.

It is thus a given that the typical consumer is comfortable with changing the light bulb, but not the switch. A light bulb of the parent application invention contains all the innovation required to overcome the aforementioned drawbacks. It requires neither a 3-way socket nor a special fixture. All control is performed by simply using the existing switch or switches.

Controls for the electrical devices of this invention are configured to provide the same advantage of the light bulbs of parent application wherein a regular 2-terminal bulb, may be installed in either a 2-way or 3-way socket without compromising any functionality. The electrical devices herein similarly are regular or unmodified devices with respect to normal utilization but with enhanced function control with existing controls.

As with the light bulbs of the parent application, full control of the electrical device is provided at all of the two, three, or more switch locations for a given circuit, as long as those switches are able to turn power Off and On, which, of course, is their primary and only function, without changes of electrical wiring or the need for additional control installation. The same existing switches and wiring are used.

Still another advantage of the invention is that electrical device function, other than ON/OFF, and other adjustments are enabled for rooms with an extremely large number of such devices such as large rooms with multiple ceiling fans. For new installations, where highly efficient electrical devices are used, they may be variably controlled on a single circuit. As with the light bulbs of the parent application, the electrical devices are directly and integrally provided with control circuitry which enables device function to be controlled by specific manipulation of the existing control switches such as ON/OFF switches.

This is analogous to dimming of light bulbs, accomplished within the bulb of the parent application, without a central dimmer that must handle the aggregate heat dissipation. Other device functions are further analogous to variable color temperature control. These advantages are all enabled by something called "continuous wave modulation." Continuous wave modulation, or "CW" as it is abbreviated, means sending a signal by multiple turnings of something On and Off, similar to how radio operators send messages using Morse code. The messages of this invention and that of the parent application are sent by a momentary toggle of a switch to off, once power has already been applied, or a momentary toggle of a switch to On, once power has already been removed. One of the main advantages of CW is its extreme simplicity. No special modulators or transmitters are needed. Everything is accomplished with simple On/Off transitions. This invention uses the switches of an existing circuit to send very brief "power line messages" as the described On or Off signals to the electrical devices of the invention installed in that circuit.

Many possible embodiments of the invention in the parent application were cited as being possible including, but were not limited to:

(1) A multiple color temperature light bulb containing both Warm White and Cool White light emitting elements wherein a click of the switch sequences among energized states of just Warm, just Cool, and Both types of light-emitting elements.
(2) A multiple brightness light bulb wherein a click of the switch sequences among energized states of different brightness where the dimming is accomplished with PWM (Pulse Width Modulation) generated internally in the bulb.
(3) A multiple brightness light bulb containing multiple internal light-emitting elements, such as many LED bulbs have, wherein a click of the switch will sequence among brightness states by energizing various numbers of its multiple internal light-emitting elements between all and one.
(4) A bulb with both adjustable brightness and adjustable color temperature, both of which are controlled and adjusted from multiple locations via switch flicks.
(5) A multiple function bulb incorporating a general purpose micro-controller to implement the methods of the invention for flexibility of design and cost saving.

The parent application was specifically directed to control of bulbs and bulb fixtures which detect and respond to fluctuations of power from existing switches to control the lighting state (brightness and/or color temperature) and stored memory of those states. The present application extends the teachings of the parent application to 1) further specify selectable invisible and visible light spectrum modes and combinations thereof particularly with invisible disinfecting UV spectrum light; and 2) further specify selectable directional modes, as enumerated, for example, in the above garage bulb enhancements.

Another embodiment of the present invention is that of multiple light modules. A reasonable dimming enhancement for fixtures with many bulbs is to add a single module which responds to power switch fluctuations and dims all its standard bulbs, rather than requiring replacement of all of them with bulbs of the invention. This module is not a bulb, light emitting device, or fixture and is included herein as an enhancement in utilizing multiple common bulbs without separate circuitry. This device enhancement can be installed in multiple places, such as inside or outside the fixture, or inside or outside the light switch housing.

A further embodiment herein is that of a replacement light switch specially made for use with power fluctuation bulbs, fixtures, and fans of the invention. This electronic switch can add scheduling of stored changes (so the stored memory state of devices (even when off) gets set to Cool before any daytime use, and set to Warm, before and evening and night use. It can also simplify use by replacing multiple manual power toggling with single button composite.

The embodiment described is for a light bulb of the invention having two LED light-emitting elements of different Spectrum types visible and invisible (UV), selectable through successive Off-On cycling of the power.

Referring to FIG. 1, line voltage power 102 passes through external power switch 104 and enters light bulb housing 106. Control circuitry 105 operates through power supply 107 and power Output Circuits 108 to power any combination or separate activation of visible white LEDs 109 and ultraviolet LEDs 110.

Figure 2:
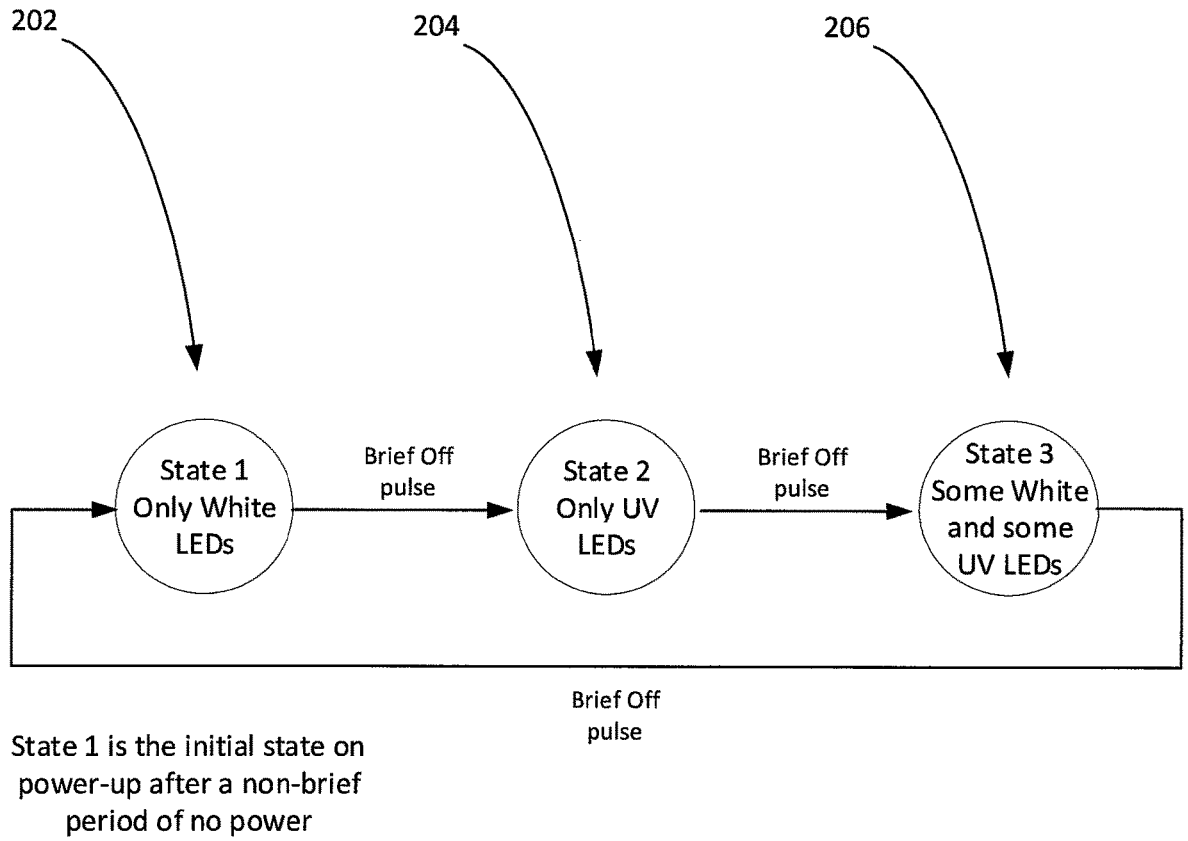
FIG. 2 shows a state diagram of an embodiment with dual light spectrum types.

Referring to FIG. 2 a state diagram is shown with initial state 202 of activated only white LEDs. It will subsequently cycle through the state 204 of only UV LEDs, and then state 206 of both visible white and invisible UV LEDs. State 206 energizes both UV and White LEDs and has a color temperature between Warm and invisible as perceived by human vision. Subsequent brief power off pulses cycle back to state 202, repeating the 3-state cycle. State changes are thus initiated from each and every switch controlling power to the light fixture in which this bulb is housed. Multiple instances of this bulb that are on the same power circuit and switch will operate in complete unison with each other. Additional switches at other locations, for example a 3-way switch or one or more 4-way switches, will all provide duplicate lighting control from their respective switch locations as those circuits provide On-Off control from each of the switches.

Figure 3A:
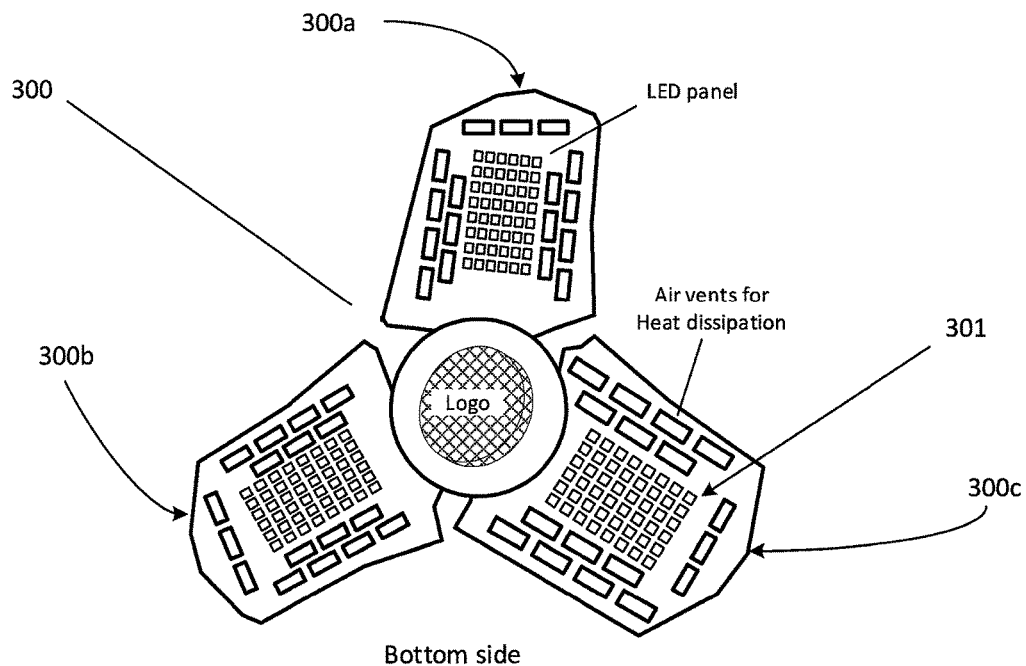
FIGS. 3A and 3B show bottom and top overviews respectively of a garage style bulb/fixture with multiple panels.
Figure 3B:
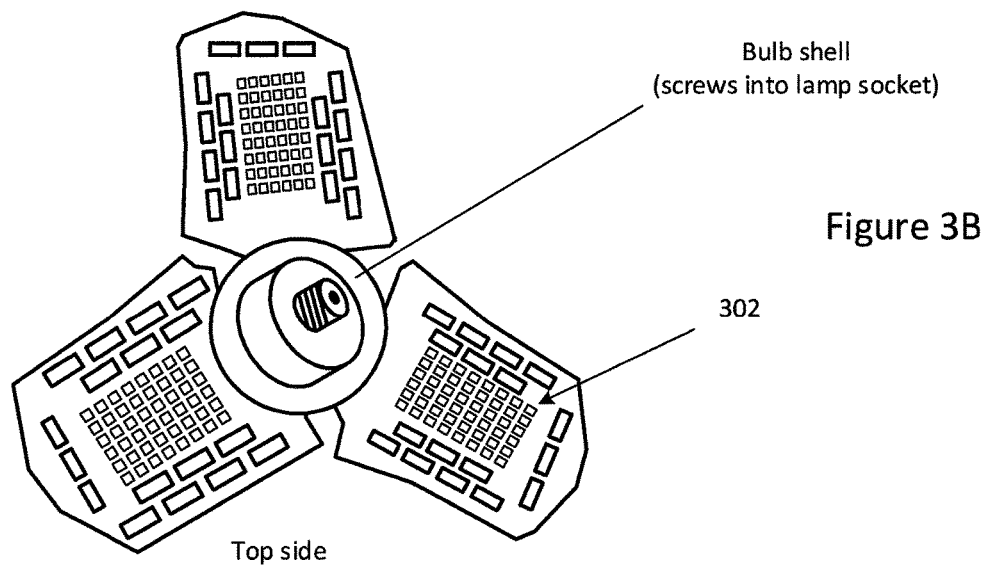
Figure 4:
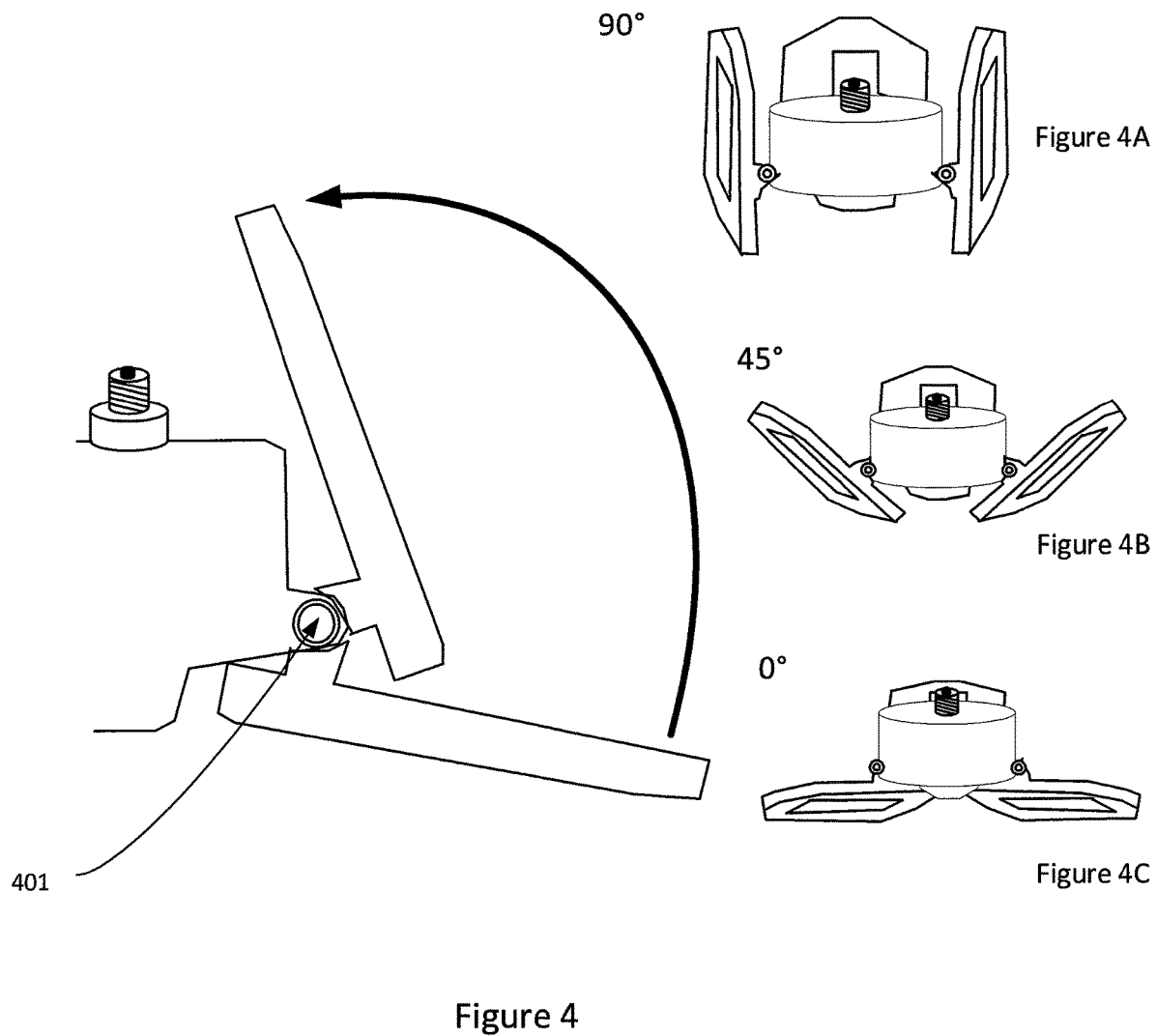
FIG. 4 shows the deformable nature of the garage style bulb panels of FIGS. 3A and 3B.
Figure 5:
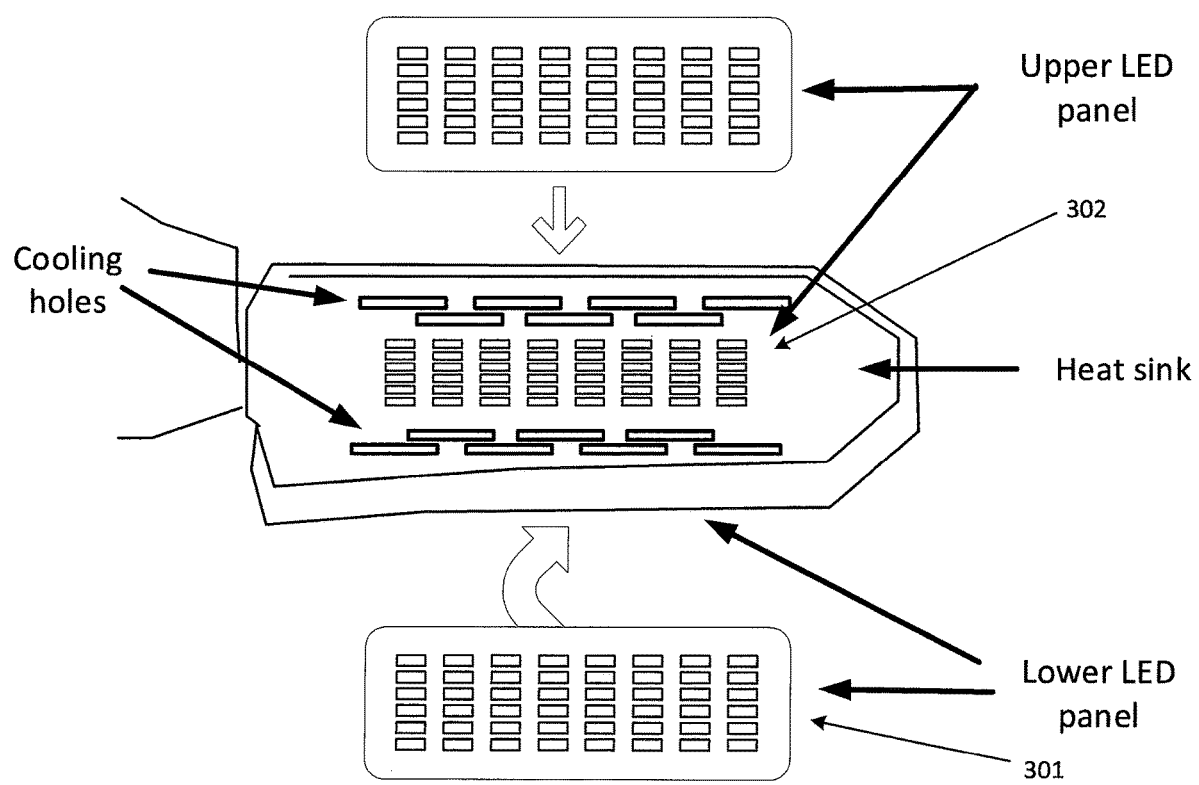
FIG. 5 shows a garage style bulb with LED illumination panels on both upper and lower sides of the devices flower-like petals.
Figure 5A:
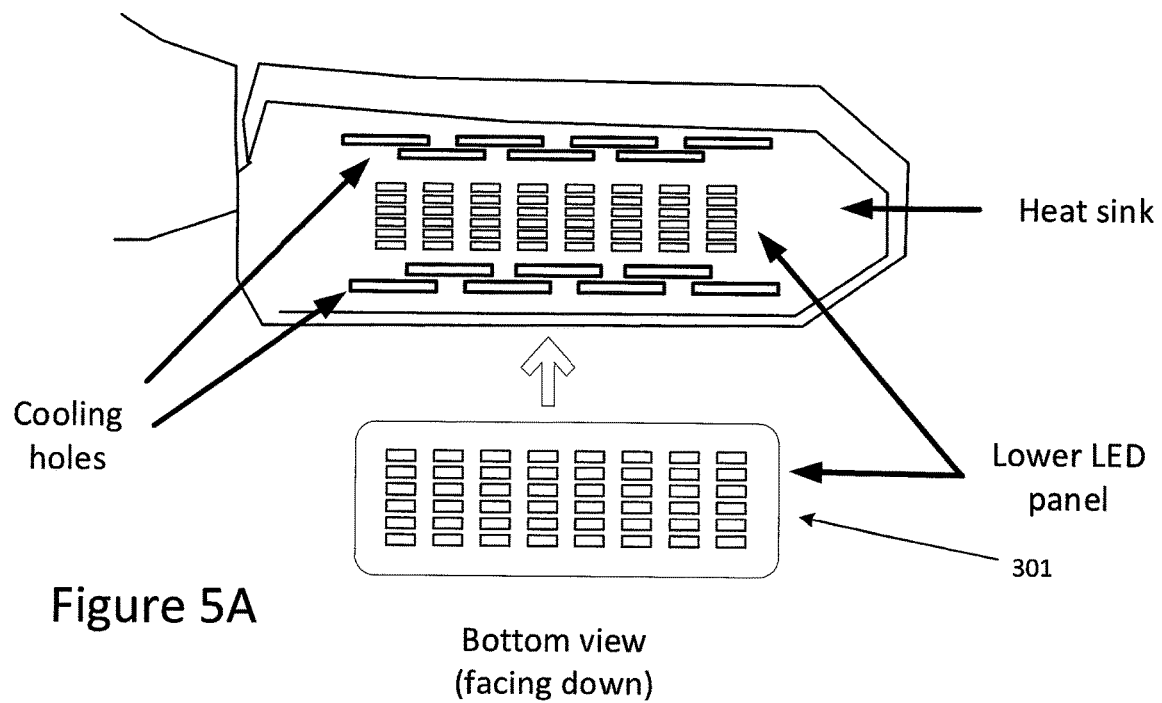
FIGS. 5A and 5B separately show the upper and lower side arrangements of the bulb petals of FIG. 5.
Figure 5B:
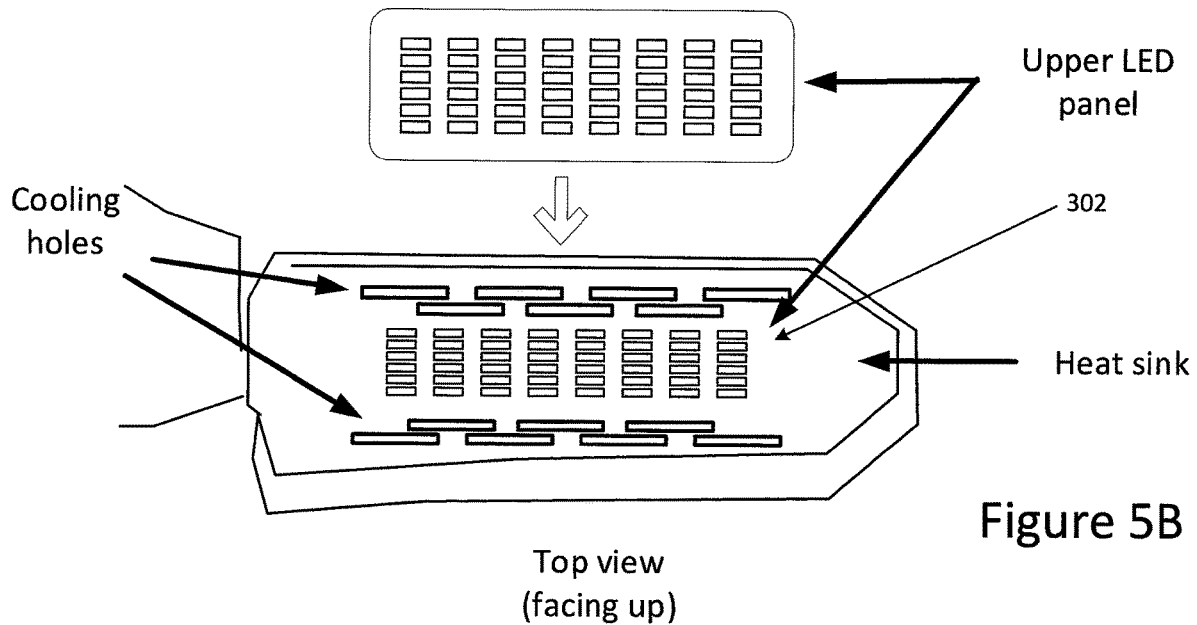

FIGS. 3A and 3B show an overview of one such a bulb 300 from Freelicht Lighting, from the bottom and top respectively. The one shown has three planar "petals" 300a, 300b, 300b with their respective light facing downward, but similar garage bulbs may have more petals, with petals pivoting at a point anywhere along their length. This one pivots at the innermost (closest to the central vertical axis) point 401 as shown in FIG. 4. FIGS. 4A, 4B and 4C illustrate various petal positions (vertical, angled and horizontal). Rather than using mechanical devices such as motors, the LED petals 300a-c may have LED emitters on both upper and lower of the petal's surfaces 301 and 302 respectively. The upward/downward selection is then done purely electrically via an electronic micro-controller within the garage light (not shown). For example, FIG. 5 shows such a bulb with both a lower as well as an upper LED panel as in FIGS. 5A and 5B.

Timer mechanisms may further be included in the UV LED state to safely limit exposure time to UV light. Alternatively, or in addition, the UV device, system or ceiling fixture is provided with a motion detection sensor which shuts off the UV radiation upon motion detection. As a visual safety indicator even without triggering of the motion detection sensor, a blinking red light may be utilized to warn of UV light emission being currently active. Activation of the bulb, bulbs or fixtures is with both volatile and non-volatile memory.

It is understood that the above description and drawings are illustrative of the invention and that changes may be made to circuitry and applications as well as to controlled devices without departing from the scope of the invention as defined in the following claims.

What is claimed is:

1. A light-emitting device comprising a plurality of individual light emitting sub-elements, contained within a single housing having light transmittable walls, the sub elements respectively selectively emitting two types of light spectra through the housing walls, with a light type selective control, a first light spectra type being visible, and a second light spectra type being invisible UV light with a UV spectra which is in at least one of a UV-A, UV-B and UV-C germicidal range, wherein the housing is configured to be electrically functionally seated in a standard lighting base.

2. The device of claim 1 wherein said device is a light bulb.

3. The device of claim 2 wherein said device is a fixture.

4. The device of claim 2, wherein the device comprises full selective control of light type states configured to be achieved via sequential toggling of a power switch which is electrically controllably connected to the lighting base.

5. The device of claim 2 wherein full selective control of light type states is achieved via a means other than sequential toggling of a power switch electrically controllably connected to the lighting base.

6. The light emitting device of claim 5, wherein the device comprises a light bulb with wireless selective control.

7. The light emitting device of claim 1, wherein the device comprises a motion detection sensor wherein the UV light is configured to be shut off when the motion detection sensor detects motion.

8. The light emitting device of claim 1 wherein an indicator mechanism is activated while the UV light is being transmitted.

9. The light emitting device of claim 8, wherein the indicator mechanism is a colored light.

10. The light emitting device of claim 8, wherein the indicator mechanism is a blinking light.

11. The light emitting device of claim 5, wherein the sequential toggling of the power switch is configured to effect states of: a) both invisible UV and visible light being on, and b) visible light being on, or c) invisible light being on.

12. A light-emitting device comprising a plurality of individual light emitting sub-elements selectively emitting two types of light spectra with a light type selective control, a first light spectra type being visible, and a second light spectra type being invisible UV light with a UV spectra which is in at least one of a UV-A, UV-B and UV-C germicidal range, wherein all the light emitting sub-elements are configured to be electrically functionally powered by a single standard lighting base.

13. A method of synchronizing wireless control for a light-emitting device comprising a plurality of individual light emitting sub-elements selectively emitting two types of light spectra with a type of light selective control, a first type of light spectra being visible, and a second type of light spectra being invisible UV light with a UV spectra in a germicidal range, located in one room, the method comprising the steps of:
   a) including multiple wireless control RF channels in the device with unique codes within a specific controller; and
   b) accepting a unique code from the specific controller within a predetermined period of time of light activation.

14. A light-emitting device comprising a plurality of individual light emitting sub-elements emitting two types of light spectra, a first type being visible, and a second type being invisible UV light or less visible to invisible infrared light, wherein the device comprises a fixture with multiple movable petals with each having one or more light emitting elements which are controlled by control mechanisms, with one or more adjustments, the adjustments including at least one of:
   1. brightness,
   2. color temperature,
   3. light emission direction via an electrical motor mechanism comprising one or more motors or servo-motors, configured to adjust the direction or angle of light emission, and
   4. light emission direction via the device further comprising the petals being further configured to have light emitting elements on both upper and lower surfaces of the petals.

15. The light emitting device of claim 14, wherein the motors further comprise a mechanical linkage to one or more petals corresponding to a central and radial petal flower nature of the device, configured to physically position the petals at one of a plurality of angles, including rotations in the vertical plane and/or rotations in a horizontal plane and flipping the petals over, or combinations thereof to effect the change of light emission direction.

16. The light emitting device of claim 15, wherein the device comprises control electronics configured to provide selective energizing of the illumination from the upper and lower surfaces of the petals, or combinations thereof.

17. The light emitting device of claim 14, further comprising an element to provide a plurality of types of state adjustments, and with the control mechanism configured to be in a plurality of different cycles of states, with each cycle corresponding to one of the types of state adjustments, the control circuitry further configured to comprise an additional control signal to effect a change of cycling to correspond to a different consecutive type of state adjustment cycling, said additional control signal comprising using one of a reset signal or pausing for a set period of time after a state change.

* * * * *